Feb. 18, 1936.　　　A. AGRICOLA　　　2,031,295

TUNING INDICATOR

Filed April 22, 1935

INVENTOR
A. AGRICOLA
BY
ATTORNEY

Patented Feb. 18, 1936

2,031,295

UNITED STATES PATENT OFFICE 2,031,295

TUNING INDICATOR

Alfred Agricola, Berlin-Tempelhof, Germany, assignor to Allgemeine Elektricitatz, Berlin, Germany, a corporation of Germany Application April 22, 1935, Serial No. 17,653
In Germany April 18, 1934

5 Claims. (Cl. 116—124.1)

The invention is concerned with the indicator means used in the tuning of broadcast receiver sets. Scale arrangements are known in the prior art in which the station names or marks or the like identifying the latter are provided in any arbitrary order, i. e., in an arrangement independent of the wave-length corresponding thereto, say, in an alphabetic disposition or in the shape of a geographical map or chart. Such a map is shown by way of example in Fig. 1. The station names 1, 2, 3, 4, are disposed upon a map in accordance with their geographical situation, that is to say, each station being marked, for instance, by a circular hole in a map the rest of which is opaque, whereas posteriorly of the said map there is a disk or a film being in coupling relationship with the tuning means and which upon actuation of the tuning means is caused to travel posteriorly of the map. Now, upon this marking or covering disk are arranged circular openings in such a way that as soon as the tuning element has been set to a definite wave-length, the opening in the map which corresponds to the station in question will be caused to be illuminated by the lamp disposed in the rear of the covering or masking plate; in other words, the openings in the latter plate are so arranged that each time the apparatus is set to a station, the opening of the cover plate or masking film comes to register or coincide with the corresponding aperture in the map. The indication in scales of this kind could be also chosen in such a way that the appearance of a definite mark, say, a small colored circle which is disposed upon the plate or film arranged posteriorly of the map, manifests in the opening provided in the map the state of tuning to the wave-length of the station in question which is co-ordinated to such opening.

Figure 1:
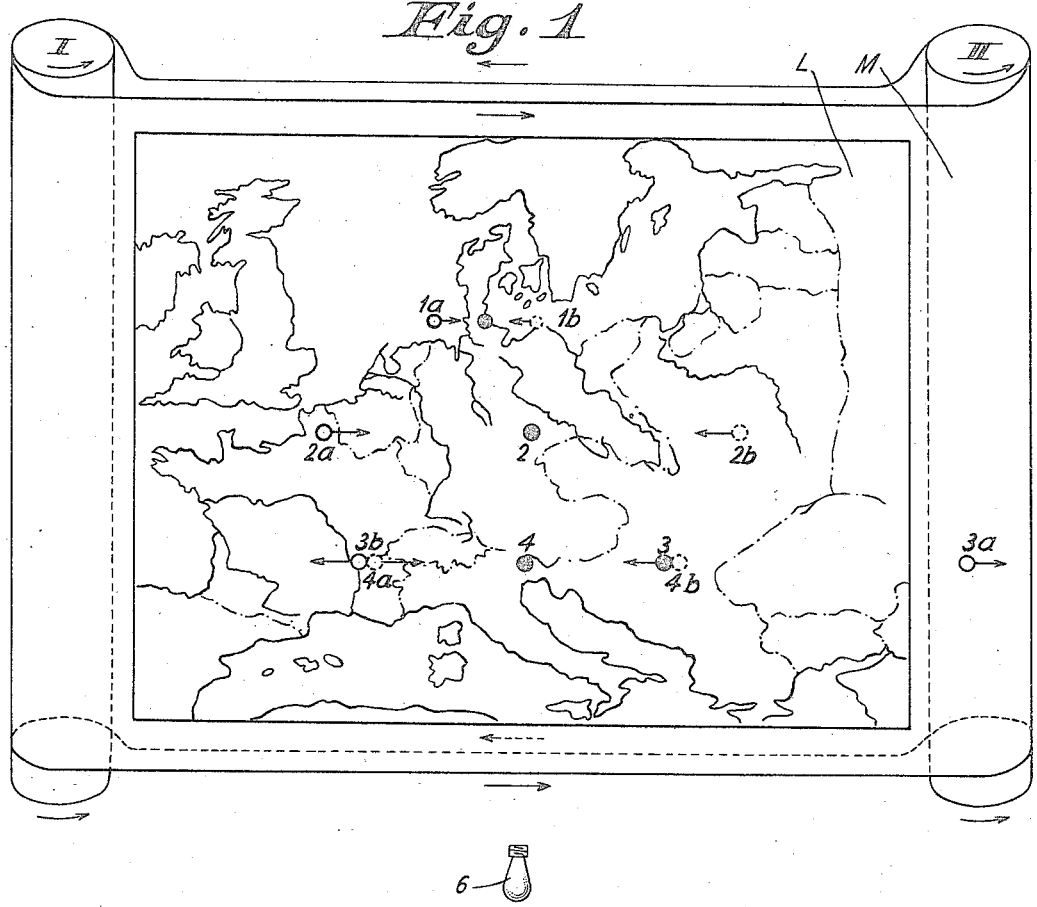
Figure 2:
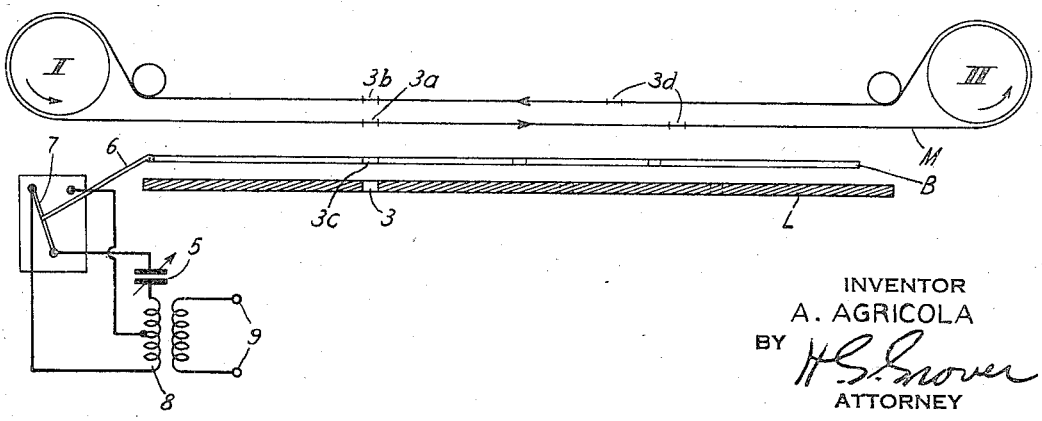

In the case of such or similar scales in which the station names are disposed not in accordance with the wave-length, but in accordance with some other order or disposition independent therefrom upon the scale or dial device, there is found, however, this difficulty that whenever several stations happen to be located in line (behind each other) in the direction of motion of the plate, no clear-cut and evident indication of the adjustment of the tuning element to the station in question is obtainable. This situation will be explained in reference to the case of a rectilinear motion of the marking plate disposed posteriorly of the map by reference to Fig. 1. For a better understanding of the invention reference is made to the accompanying drawing, in which;

Fig. 1 is a perspective view of a tuning indicator made according to the invention and, Fig. 2 is a partial section through the device of Fig. 1 and also showing a wave change switch associated therewith.

In the arrangement as indicated, the stations 3 and 4 indicated upon the map L are positioned exactly in the line of motion of the horizontally moved marking film or strip M. Upon the movement of the film M which carries the opening 3a for station 3, and opening 4a for station 4, stations 3 and 4 are caused to flash up twice. The station 3 flashes up once when the opening 3a registers with the opening 3, but again when the opening 4a coincides with the opening 3. Similarly, station 4 will flash once when the opening 3a comes to be in registry with the opening 4; and the second time when the opening 4a registers with opening 4. No clear-cut and reliable tuning of the receiver set to one of the desired stations is possible in the said manner. Identical conditions would arise if in the circular movement of the marking disk, stations came to lie on the same arc and in sequence one behind the other. The likelihood of this happening is particularly great whenever the number of stations on the map is very large or when the surface or area available for the accommodation of a map is very limited with the result that the broadcast stations seem to be crowded together.

Now, these difficulties are obviated according to this invention by that the indication of the tuned condition of a tuning element to a certain station is not insured by the coincidence or registry of merely two marking points, but of at least three such points, of which one is fixed, e. g., in a geographic scale in accordance with the position upon the map or in an alphabetical arrangement in accordance with the position of the station name in question in the alphabet, whereas for indication of setting of the tuning element to the station in question by the movement of the setting means at least two additional marking points are caused to register with the marking point corresponding to this same station. As shown in Fig. 2 in more detail, this is accomplished in the manner that posteriorly of the map L bearing the identifications or markings for the stations, there is provided an endless band or web M whose width is chosen to suit the width of the map, the said band M being conveyed over the drums I and II which are associated with the tuning means such as the rotor plates of condenser 5 by means of any type of well known type of gearing.

Now, in the band M which is opaque the openings 3a and 3b are provided at such places that upon adjustment of the tuning means to the wave-length of station 3 the two openings 3a and 3b come to lie in a straight line with the opening 3 in the map as shown in Fig. 2. Then the opening corresponding to station 3 will be illuminated by the lamp 6 disposed at the rear of the band. Hence, in this arrangement, a station such as 4 in the scale L will not yet be caused to flash up if, for instance, only one opening of the band M happens to be in registry with the corresponding station; on the contrary, in order that this may happen it is necessary that two openings in the band M, being caused to move as a result of the actuation of the tuning element, come to coincide with the opening in the map L. As a result, as will thus be seen, in an arrangement as just disclosed, the station 4, which as represented in Fig. 1 is at the same level as the opening 3a on the band, will not be caused to flash up if upon the movement of the band M the opening 3a comes to register with the opening 4; for in this position, the opening 3b will not coincide with openings 3a and 4. On the contrary, a flashing up of the station hole in an arrangement as here disclosed will be feasible at all only whenever three openings happen to be in direct registry. In this disposition therefore, the indication of the tuned state of each station to the corresponding wave-length will be clear-cut and free from errors or doubts.

If in the same set the same tuning element is provided for several wave-lengths or bands as is true of the majority of broadcast receiver sets, then, in an arrangement as chosen, the stations of each wave-band upon each and any actuation of the tuning element will be caused to flash up whenever the tuning means is adjusted to the corresponding wave-length, though during the movement of the tuning means also the stations of the other wave-bands will flash up to which the set is not adapted or connected. Now, in order that unnecessary flashing of station names or the marks corresponding thereto may be avoided in so far as the undesired wave-bands are concerned, the arrangement according to another object of the invention may be further provided between scale L and the mask M with a cover plate B which is so shaped that only the station names pertaining to one wave-length range or band will be illuminated. For this purpose the said screen disk or plate B may be coupled with the wave-band switch so that, when a change is made from one to other bands the same is caused to occupy different positions. Upon the said plate are openings at places, for instance, for the station 3 the opening 3c, so that only in the position of the said plate corresponding to the wave-band that is desired the openings of the said plate will come in registry with the openings of the stations of the same band, while the openings of the stations pertaining to other wave-bands will be covered up. As will thus be seen, when operating the tuning means the stations of the wave-band concerned will be caused to flash up.

As shown in Fig. 2 the plate B is shown connected by a link 6 with the wave change switch 7 which is associated with a resonant circuit of the receiver and comprising the tapped transformer coil 8 and the tuning condenser 5, the incoming radio signal frequency being applied to the terminals 9 of the transformer in any known manner.

Having described my invention, what I claim as novel and desire to secure by Letters Patent is:

1. In a device for indicating the position of a tuning means the combination of a movable member connected to said tuning means and provided with a plurality of apertures, a stationary member provided with a plurality of apertures, and a source of illumination behind said movable member, at least one of the apertures of said stationary member being in alignment with two apertures of said movable member when said tuning means is adjusted to a desired frequency.

2. In a device for indicating the position of a tuning means, the combination of a movable member connected to said tuning means and provided with at least two apertures arranged to move in opposite directions upon adjustment of said member, a stationary member provided with a plurality of apertures corresponding to desired station positions, and a source of illumination behind said movable member, two of the apertures in said movable member coming into alignment with an aperture in said stationary member when said tuning means is adjusted to a desired frequency.

3. In combination, a resonant circuit including means for tuning said circuit, a wave change switching device arranged to change the tuning range of said circuit from a higher to a lower frequency band, a flexible indicating means having oppositely movable adjacent portions connected to said tuning means arranged to indicate the resonant condition of said circuit and a device for screening said indicating means connected to said switching device.

4. In combination, a resonant circuit including adjustable means for tuning said circuit, a wave change switch arranged to change the tuning range of said circuit from a higher to a lower frequency band, an indicator having a plurality of apertures therein connected to said tuning means, a member having a plurality of apertures therein arranged to be successively in alignment with the apertures of said indicator and a screening member connected to said wave change switch and mounted between said last named member and said indicator said screening member being provided with a plurality of apertures simultaneously in alignment respectively with certain of the apertures in said member.

5. An indicating mechanism for a radio apparatus or the like comprising in combination, a relatively movable map and masks, a source of light rearwardly of said masks, the said map and masks being provided with apertures which are registerable with one another when the said map and masks are in a certain position and means to move the map and masks simultaneously relative to one another whereby certain apertures of the masks are brought into register with one another and with a certain aperture of the map.

ALFRED AGRICOLA.